(12) United States Patent
Sorem et al.

(10) Patent No.: US 11,890,839 B2
(45) Date of Patent: Feb. 6, 2024

(54) MULTI-LAYER FILMS AND RELATED METHODS

(71) Applicant: TRANSCONTINENTAL HOLDING CORP., Chicago, IL (US)

(72) Inventors: Marc David Sorem, Chicago, IL (US); Solomon O'Neil West, Chicago, IL (US)

(73) Assignee: TRANSCONTINENTAL HOLDING CORP., Chicago, IL (US)

( * ) Notice: Subject to any disclaimer, the term of this patent is extended or adjusted under 35 U.S.C. 154(b) by 0 days.

(21) Appl. No.: 17/079,324

(22) Filed: Oct. 23, 2020

(65) Prior Publication Data

US 2021/0039365 A1 Feb. 11, 2021

Related U.S. Application Data

(63) Continuation of application No. 16/096,628, filed as application No. PCT/US2017/029451 on Apr. 25, 2017, now abandoned.

(60) Provisional application No. 62/329,109, filed on Apr. 28, 2016.

(51) Int. Cl.

| | |
|---|---|
| *A23C 19/076* | (2006.01) |
| *B65D 65/40* | (2006.01) |
| *B32B 27/08* | (2006.01) |
| *B32B 7/12* | (2006.01) |
| *B32B 27/00* | (2006.01) |
| *B32B 27/10* | (2006.01) |
| *B32B 27/18* | (2006.01) |
| *B32B 27/20* | (2006.01) |
| *B32B 27/34* | (2006.01) |
| *B32B 27/36* | (2006.01) |
| *B32B 27/32* | (2006.01) |
| *B32B 27/30* | (2006.01) |
| *B32B 15/082* | (2006.01) |
| *B32B 15/085* | (2006.01) |
| *B32B 27/28* | (2006.01) |

(52) U.S. Cl.
CPC ............ *B32B 27/08* (2013.01); *A23C 19/076* (2013.01); *B32B 7/12* (2013.01); *B32B 15/082* (2013.01); *B32B 15/085* (2013.01); *B32B 27/00* (2013.01); *B32B 27/10* (2013.01); *B32B 27/18* (2013.01); *B32B 27/20* (2013.01); *B32B 27/28* (2013.01); *B32B 27/308* (2013.01); *B32B 27/32* (2013.01); *B32B 27/34* (2013.01); *B32B 27/36* (2013.01); *B65D 65/40* (2013.01); *B32B 2250/02* (2013.01); *B32B 2250/05* (2013.01); *B32B 2250/24* (2013.01); *B32B 2264/104* (2013.01); *B32B 2307/31* (2013.01); *B32B 2307/748* (2013.01); *B32B 2307/75* (2013.01); *B32B 2439/70* (2013.01)

(58) Field of Classification Search
None
See application file for complete search history.

(56) References Cited

U.S. PATENT DOCUMENTS

| | | | | |
|---|---|---|---|---|
| 5,106,688 A | * | 4/1992 | Bradfute | ................. B32B 27/16 428/215 |
| 5,547,752 A | * | 8/1996 | Yanidis | ................... C08L 23/08 525/196 |
| 6,815,057 B2 | * | 11/2004 | Hodson | ................... B32B 27/08 428/354 |
| 6,964,816 B2 | | 11/2005 | Schell et al. | |
| 8,440,280 B2 | | 5/2013 | Ronzani | |
| 2002/0187290 A1 | | 12/2002 | Hodson et al. | |
| 2006/0286367 A1 | | 12/2006 | Fish et al. | |
| 2008/0311261 A1 | | 12/2008 | Gullick | |
| 2019/0152198 A1 | | 5/2019 | Sorem et al. | |

FOREIGN PATENT DOCUMENTS

| | | |
|---|---|---|
| CA | 2635513 A1 | 7/2007 |
| CN | 103707586 A | 4/2014 |
| KR | 101492789 B1 | 2/2015 |
| WO | 2006026626 A2 | 3/2006 |
| WO | 2017189600 A1 | 11/2017 |

OTHER PUBLICATIONS

PCT International Search Report for PCT International Patent Application No. PCT/US2017/029451, dated Jul. 13, 2017.
Notification of Requisition dated Dec. 19, 2022; Canadian Patent Application No. 3,022,393; 5 pages.
Notification of Requisition dated Aug. 25, 2023; Canadian Patent Application No. 3,022,393; 4 pages.

* cited by examiner

*Primary Examiner* — Sheeba Ahmed
(74) *Attorney, Agent, or Firm* — HOLLAND & HART LLP (57) ABSTRACT

The present disclosure relates to multi-layer film constructions and related methods. The multi-layer film constructions can include a first layer joined to a second layer. The first layer can include one or more heat resistant materials. The second layer can include a sealant film, which can be a multi-layer film having one or more sealing layers or sublayers. The sealing layers can include a blend of one or more ionomers and polybutylene. The multi-layer film constructions can also be free from or devoid of wax.

17 Claims, 4 Drawing Sheets

MULTI-LAYER FILMS AND RELATED METHODS

CROSS-REFERENCE TO RELATED APPLICATIONS

This application claims priority to U.S. Provisional Application No. 62/329,109 filed Apr. 28, 2016, titled MULTI-LAYER FILMS AND RELATED METHODS, the entire contents of which are hereby incorporated by reference in their entirety.

TECHNICAL FIELD

The present disclosure relates generally to multi-layer film constructions and related methods. The multi-layer film constructions can be used to package various products, including processed cheese and cream cheese.

BRIEF DESCRIPTION OF THE DRAWINGS

The written disclosure herein describes illustrative embodiments that are nonlimiting and nonexhaustive. Reference is made to certain of such illustrative embodiments that are depicted in the figures, in which.

DETAILED DESCRIPTION

The present disclosure relates generally to multi-layer film constructions and related methods. In some embodiments, the multi-layer film constructions can be used to package cheese products, such as processed cheese and cream cheese. The multi-layer film constructions can also be free from or devoid of wax.

For the purposes of promoting an understanding of the principles of the disclosure provided herein, reference will now be made to the embodiments illustrated in the drawings and specific language will be used to describe the same. It will be readily understood with the aid of the present disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. In some cases, well-known structures, materials, or operations are not shown or described in detail. While the various aspects of the embodiments are presented in drawings, the drawings are not necessarily drawn to scale unless specifically indicated.

Figure 1:
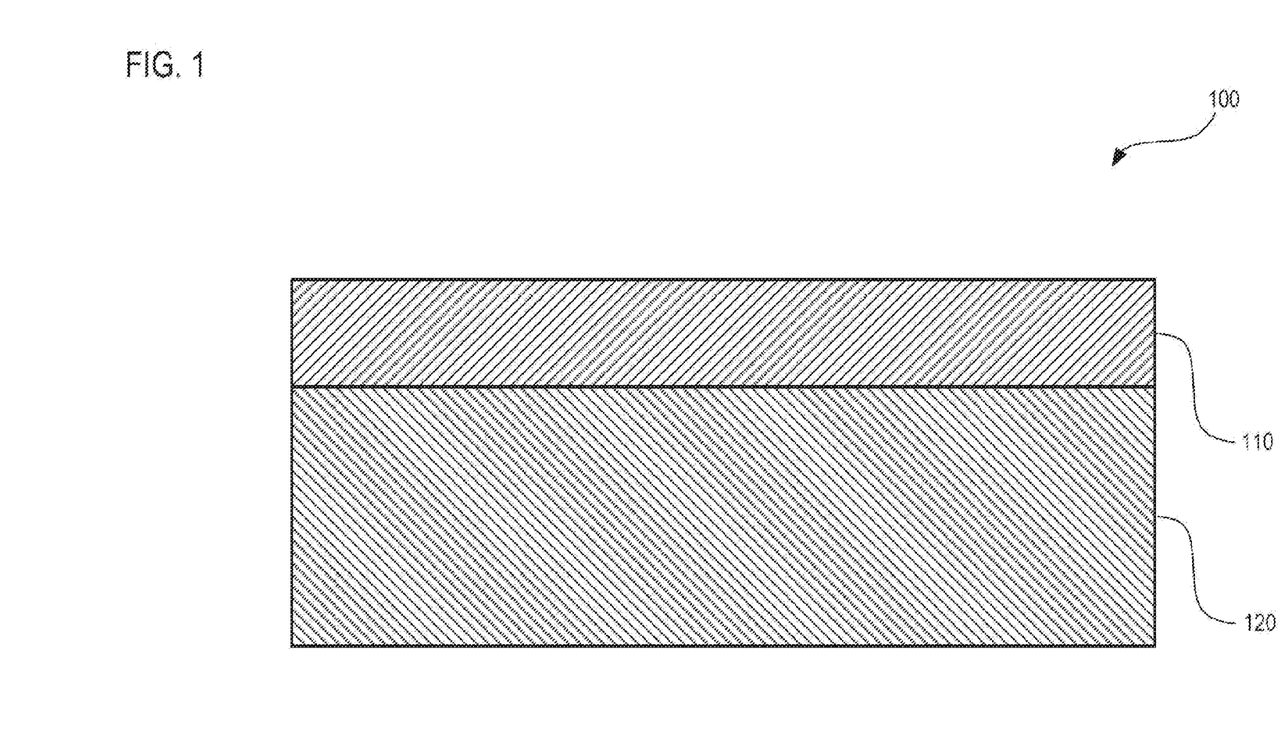
FIG. 1 is a cross-sectional view of a multi-layer film construction, according to an embodiment of the present disclosure.
Figure 2:
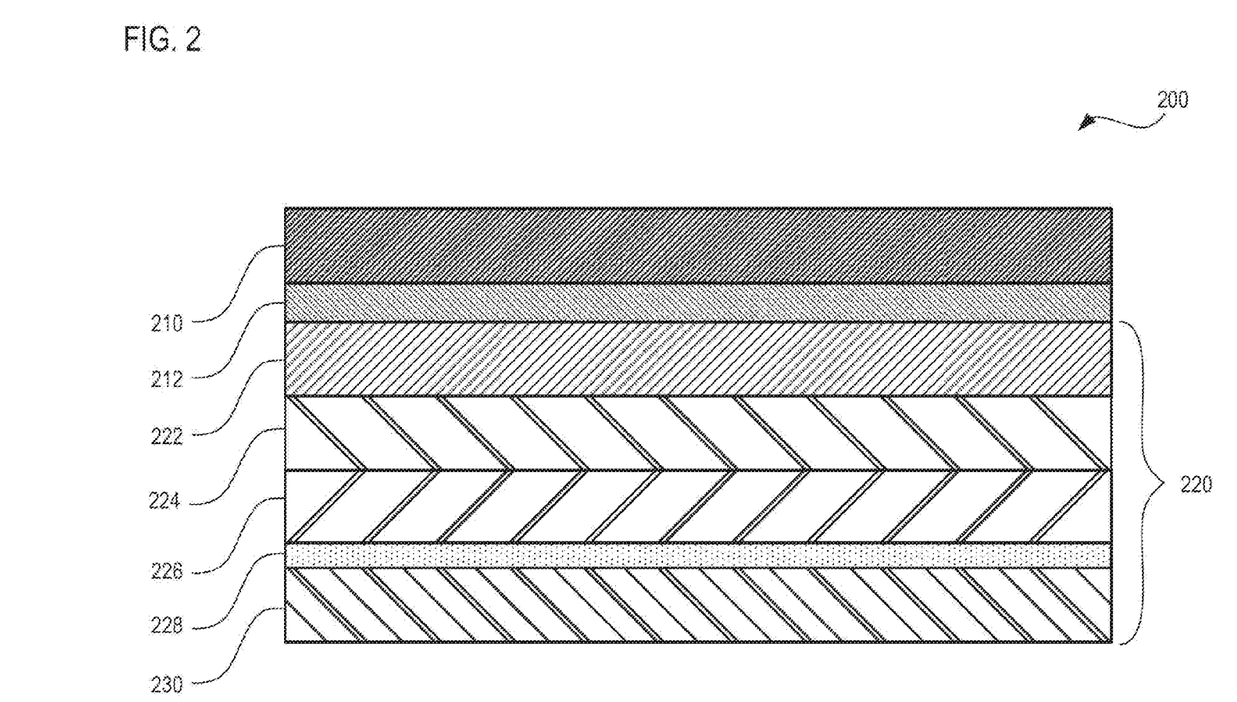
FIG. 2 is a cross-sectional view of a multi-layer film construction, according to another embodiment of the present disclosure.

FIG. 1 depicts a multi-layer film or multi-layer film construction 100 according to an embodiment of the present disclosure. As shown in FIG. 1, the multi-layer film 100 comprises a first layer 110 and a second layer 120. In certain embodiments, the multi-layer film 100 may further comprise one or more additional layers in addition to the first layer 110 and the second layer 120. For example, one or more additional layers can be disposed on either side or major surface of the first layer 110 (see, e.g., FIG. 3) and/or on either side or major surface of the second layer 120. One or more additional layers (e.g., a film layer, a tie layer, an adhesive layer, a primer layer, an ink layer, etc.) can also be disposed between the first layer 110 and the second layer 120 (see, e.g., FIG. 3). Further, in some embodiments the first layer 110, the second layer 120, and/or the one or more additional layers can comprise or be constructed from a plurality of sublayers (e.g., a multi-laminate film layer, a multi-laminate tie layer, a multi-laminate adhesive layer, etc.), as depicted in FIG. 2 and detailed below.

The first layer 110 may comprise or be constructed from various materials, including one or more heat-resistant materials. As can be appreciated, heat resistant materials can provide, for instance, increased heat resistance, increased flex crack resistance, and/or barrier properties (e.g., including abuse resistant properties such as puncture-resistance, tear-resistance, scratch-resistance, grease-resistance, odor-resistance, moisture-resistance, absorption-resistance, and the like) to the multi-layer film 100. The first layer 110 can also be suitable for marking, inscribing, and/or printing indicia thereon, which can be advantageous in embodiments where the first layer 110 is configured to be the outer or outermost layer of a packaging structure.

Illustrative materials that can be used in the first layer 110 include, but are not limited to, polymers or copolymers of polyamide (e.g., nylon), polymers or copolymers of polyester (e.g., polyethylene terephthalate (PET)), polymers or copolymers of polypropylene, metal or metal foil (e.g., aluminum, nickel, chromium, etc.), cellulose (e.g., cellophane), paper, and derivatives, blends, or combinations thereof. The materials can be oriented (e.g., biaxially oriented), nonoriented, woven, or otherwise configured as desired. For example, in particular embodiments the first layer 110 may comprise or be constructed from biaxially oriented nylon (BON), biaxially oriented polyamide (BOPA), oriented polypropylene (OPP), biaxially oriented polypropylene (BOPP), and/or biaxially oriented polyester (BOPET). The materials can also be metalized. For example, in certain embodiments, the first layer 110 comprises or is constructed from metalized polyester (MET-PET), metalized polypropylene, or metalized oriented polypropylene (MET-OPP). Other materials can also be used.

In some embodiments, the first layer 110 can optionally be treated with a coating, which can impart one or more properties to the multi-layer film 100. For example, a coating can be used to impart additional abrasion resistance. A coating can also be used to impart an aesthetically appealing gloss finish to the multi-layer film 100, and/or facilitate adhesion and/or bonding of the multi-layer film 100 to other substances or substrates. A coating can be used to cover and/or protect a print layer. A coating can also increase, or decrease, the coefficient of friction of the multi-layer film 100. Other known coatings can also be used to impart desired properties to the multi-layer film 100 as desired.

In certain embodiments, a coating such as an overprint varnish can be applied to the first layer 110 (or another layer of the film). For example, in some embodiments the first layer 110 can be marked, inscribed, or otherwise printed upon (e.g., with an ink). In some embodiments, the marked, inscribed, or otherwise printed upon surface can be adhered to the second layer 120. In such embodiments, the first layer 110 may be transparent, or substantially transparent, such that the marking, inscribing, or printing can be viewed through the first layer 110. In other embodiments, the marked, inscribed, or otherwise printed upon surface can be disposed away from the second layer 120. In such embodiments, an overprint varnish can be applied to cover and/or protect the marked, inscribed, or otherwise printed upon surface.

Figure 3:
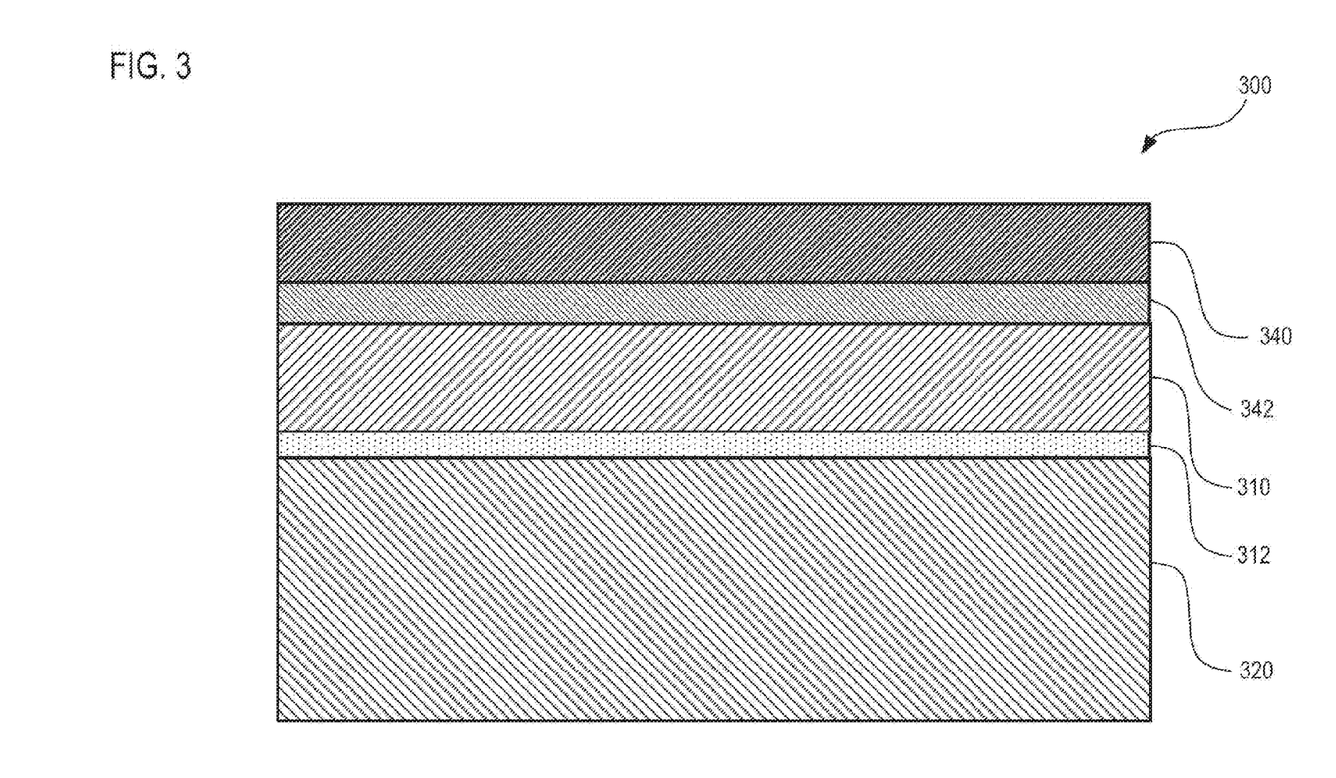
FIG. 3 is a cross-sectional view of a multi-layer film construction, according to yet another embodiment of the present disclosure.

In various embodiments, a metal foil layer can also be adhered to the first layer 110, such as is shown in FIG. 3 and detailed below. In such embodiments, a coating can be applied to a surface of the metal foil layer. For example, a coating such as an overprint varnish can be applied to a surface of the metal foil layer that is marked, inscribed, or otherwise printed upon (similar to the coating described above with respect to the first layer 110).

As shown in FIG. 1, the first layer 110 can be joined, attached, laminated, and/or adhered to the second layer 120, which can be performed using various methods and processes, including, but not limited to, lamination and/or extrusion techniques. Exemplary lamination techniques that can be employed include, but are not limited to, extrusion lamination techniques and adhesion lamination techniques. Other known techniques for joining or adhering films can also be used.

One or more tie and/or adhesive materials can also be used to join the first layer 110 and the second layer 120. For example, tie and/or adhesive materials can be co-extruded with, laminated to, or otherwise be disposed between the first layer 110 and the second layer 120. Exemplary tie and/or adhesive materials that can be used include, but are not limited to, solvent-based adhesives, solventless adhesives, plastic type bonding materials, and co-extruded films. Other known tie and/or adhesive materials can also be used. If desired, one or more primers can also be used.

As shown in FIG. 1, the second layer 120 may be a single layer. In one embodiment, the second layer 120 may be a sealant film. The second layer 120 can also comprise or be constructed with one or more sublayers, such as shown in FIG. 2 and detailed below. In further embodiments, the second layer 120 may be a sealant film having one or more sealing layers or sublayers (e.g., a first sealing sublayer, a second sealing sublayer, etc.). Illustrative multi-layer films that can be used as the second layer 120 include, but are not limited to, multi-layer coextruded blown films, multi-layer laminated films, multi-layer rapid quench blown films, and multi-layer cast films. Other types of multi-layer films can also be used as the second layer 120.

Various materials can be included in the second layer 120, or one or more sublayers thereof. Illustrative materials include, but are not limited to, polymers or copolymers of polyethylene (PE), polymers or copolymers of polypropylene (PP), polymers or copolymers of ethylene vinyl alcohol (EVOH), polymers or copolymers of polyamide (e.g., nylon), calcium carbonate ($CaCO_3$), one or more ionomers, polymers or copolymers of polybutylene, and derivatives, blends, and/or combinations thereof. The second layer 120, or one or more sublayers thereof, can also comprise one or more adhesive and/or tie materials, including but not limited to, polyethylene (PE), modified polyethylene (e.g., maleic anhydride grafted polyethylene), terpolymers (e.g., ethylene containing terpolymers (e.g., ethylene vinyl acetate and maleic anhydride terpolymers, ethylene acrylic ester maleic anhydride terpolymers, etc.)), or derivatives thereof. Other materials can also be used in the second layer 120.

Various forms (e.g., densities) of the materials can also be used in the second layer 120, or one or more sublayers thereof, including but not limited to low density polyethylene (LDPE), linear low density polyethylene (LLDPE), very low density polyethylene (VLDPE), high density polyethylene (HDPE), and blends and/or combinations thereof. In some embodiments, LDPE can have a density range of between about 0.910 $g/cm^3$ and about 0.940 $g/cm^3$, LLDPE can have a density range of between about 0.915 $g/cm^3$ and about 0.925 $g/cm^3$, VLDPE can have a density range of between about 0.880 $g/cm^3$ and about 0.915 $g/cm^3$, and HDPE can have a density greater than about 0.940 $g/cm^3$.

As previously mentioned, in particular embodiments, the second layer 120 may be sealant film having one or more sealing layers or sublayers. In other words, the second layer 120, or one or more sublayers thereof, can comprise or be constructed from one or more sealant materials. Sealant materials can provide, for instance, sealing properties and/or sealing functionality to the second layer 120 and/or the multi-layer film 100. Sealant materials include, for instance, materials that may be used or configured to form a seal upon the application of increased pressure and/or heat. Exemplary sealant materials include, but are not limited to, polymers and copolymers of polybutylene, one or more ionomers (e.g., ethylene acid and salts thereof (e.g., ethylene methacrylic acid and salts thereof) copolymer ionomers), polymers and copolymers of polyethylene (e.g., LDPE, VLDPE, etc.), and derivatives, blends and/or combinations thereof. For example, in some embodiments, a sealing layer or sublayer can comprise blends of polybutylene and one or more ionomers. In another embodiment, a sealing layer or sublayer can comprise blends of polybutylene, one or more ionomers, and LDPE. The sealing layer or sublayer can also optionally comprise one or more additives, such as a cheese release additive or agent (e.g., glycerol monostearate (GMS)). Other materials can also be included.

Various types of ionomers can be used in the sealing layer, including but not limited to ethylene methacrylic acid copolymer ionomers and related salts (e.g., poly(ethylene-co-methacrylic acid) and related salts). In some embodiments, the ionomer is a sodium, zinc, and/or magnesium salt. Other types of ionomers can also be used. In some embodiments, the ionomer can be described as a copolymer that includes both nonionic (or electrically neutral) units and ionic (or ionized) units. In further embodiments, the ionic (or ionized) units make up less than about 15% of the copolymer.

In some embodiments, the sealing layer comprises an ionomer having a melt flow rate or melt index (at 190° C./2.16 kg) of between about 0.5 g/10 min and about 15 g/10 min, between about 0.5 g/10 min and about 12 g/10 min, between about 0.5 g/10 min and about 10 g/10 min, between about 0.5 g/10 min and about 8 g/10 min, between about 0.5 g/10 min and about 6 g/10 min, between about 0.5 g/10 min and about 5 g/10 min, between about 0.5 g/10 min and about 4 g/10 min, between about 0.5 g/10 min and about 3 g/10 min, between about 0.6 g/10 min and about 3 g/10 min, between about 0.8 g/10 min and about 3 g/10 min, between about 1.0 g/10 min and about 3 g/10 min, between about 1.0 g/10 min and about 2.5 g/10 min, between about 1.0 g/10 min and about 2 g/10 min, between about 1.0 g/10 min and about 1.6 g/10 min, between about 1.1 g/10 min and about 1.5 g/10 min, or between about 1.2 g/10 min and about 1.4 g/10 min. In certain embodiments, the sealing layer comprises an ionomer having a melt flow rate or melt index (at 190° C./2.16 kg) of between about 0.6 g/10 min and about 0.9 g/10 min, between about 1.0 g/10 min and about 1.6 g/10 min, between about 1.7 g/10 min and about 2.5 g/10 min, between about 2.6 g/10 min and about 6.0 g/10 min, or between about 6.1 g/10 min and about 15 g/10 min. In certain embodiments, the melt flow rate or melt index is measured according to ASTM D1238 at 190° C. with 2.16 kg loading weight.

In some embodiments, the sealing layer comprises an ionomer having a density of between about 0.88 g/cm$^3$ and about 1.00 g/cm$^3$, between about 0.90 g/cm$^3$ and about 0.98 g/cm$^3$, or between about 0.92 g/cm$^3$ and about 0.96 g/cm$^3$.

In certain embodiments, the sealing layer comprises an ionomer having a melting point of between about 190° F. and about 230° F., between about 195° F. and about 225° F., between about 200° F. and about 220° F., or between about 205° F. and about 215° F. In further embodiments, the sealing layer comprises an ionomer having a vicat softening point of between about 125° F. and about 180° F., between about 130° F. and about 150° F., between about 150° F. and about 180° F., between about 155° F. and about 175° F., or between about 160° F. and about 170° F.

In some embodiments, the multi-layer film 100 is free from or devoid of wax. For example, the sealing layer (including sublayers) can be free from or devoid of wax.

The thickness of the multi-layer film 100 can vary as desired. For example, in some embodiments, the thickness of the first layer 110 can be between about 36 gauge and about 100 gauge, and the thickness of the second layer 120 can be between about 1 mil and 3.5 mil. Further in certain embodiments wherein a foil layer is adhered to the first layer 110, the thickness of the foil layer can be between about 25 gauge and about 35 gauge. Other thicknesses of the layers can also be used.

If desired, the multi-layer film 100 (or any layer 110, 120, additional layer, or sublayer thereof) can further comprise one or more additional known materials that add strength, stiffness, heat resistance, durability, printability, and/or other enhanced characteristics to the multi-layer film 100. Additionally, one or more known film additives may be added to the multi-layer film 100 (or any layer 110, 120, additional layer, or sublayer thereof), such as slip agents, anti-blocking agents, colorants, odor inhibitors, oxygen inhibitors, and the like.

The multi-layer film 100 can also be used for various purposes. For example, the multi-layer film 100 can be wrapped, folded, configured, or otherwise used to manufacture a packaging structure. In certain embodiments, the multi-layer film 100 can be used in packaging cheese products, such as processed cheese or cream cheese. In some of such embodiments, a relatively hot cheese product (e.g., the temperature of the cheese can be between about 150° F. and about 190° F.) can be disposed into the packaging structure made from the multi-layer film 100.

In certain embodiments, the multi-layer film 100 can be wrapped such that the first layer 110 is oriented or otherwise directed toward the outside of the packaging structure relative to the second layer 120, and the second layer 120 is oriented or otherwise directed toward the inside of the packaging structure relative to the first layer 110 (e.g., toward the cavity within the packaging structure or toward the contents (e.g., cheese) of the packaging structure). In such embodiments, the first layer 110 can be described as an outer layer, and the second layer 120 can be described as an inner layer.

The packaging structure formed by the multi-layer film 100 can also be sealed. For example, the packaging structure can include one or more seals (e.g., a fin seal) running the length of the packaging structure, and one or more seals (e.g., a crimp seal) at the top and/or the bottom of the packaging structure. In some embodiments, seals (e.g., fin seals and crimp seals) can be formed by aligning an inner surface of a first portion of the second layer 120 with an inner surface of a second portion of the second layer 120, and joining the inner surfaces together by applying increased pressure and/or temperature.

FIG. 2 depicts a multi-layer film 200 according to another embodiment of the present disclosure. The multi-layer film 200 can, in certain respects, resemble components of the multi-layer film 100 described in connection with FIG. 1 above. It will be appreciated that all the illustrated embodiments may have analogous features. Accordingly, like features are designated with like reference numerals, with the leading digits incremented to "2." (For instance, the multi-layer film is designated "100" in FIG. 1, and an analogous multi-layer film is designated as "200" in FIG. 2.) Relevant disclosure set forth above regarding similarly identified features thus may not be repeated hereafter. Moreover, specific features of the multi-layer film 200 and related components shown in FIG. 2 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the multi-layer film 200 of FIG. 2. Any suitable combination of the features, and variations of the same, described with respect to the multi-layer film 100 and components illustrated in FIG. 1 can be employed with the multi-layer film 200 and components of FIG. 2, and vice versa. This pattern of disclosure applies equally to further embodiments depicted in subsequent figures and described hereafter.

Shown in FIG. 2 is a multi-layer film 200 having a first layer 210 and a second layer 220, which are joined using an intermediate layer 212, such as a tie layer or an adhesive layer. Further, in the illustrated embodiment, the second layer 220 comprises and is constructed using a plurality of sublayers (e.g., five sublayers). As can be appreciated, additional or fewer sublayers can also be used to construct the second layer 220. Further, each of the various sublayers 222, 224, 226, 228, 230 can impart one or more properties to the multi-layer film 200. For example, in some embodiments, one or more sealant layers can be included as one or more sublayers in the second layer 220, each of which can comprise any one or more of the above-mentioned sealant materials. Tie and/or adhesive layers can also be used for joining one or more sublayers together. Additional sublayers and materials can also be included to add stiffness and/or strength to the second layer 220.

In a particular embodiment, the second layer 220 comprises one or more layers comprising polyethylene or blends thereof. For example, in the illustrated embodiment, the second layer 220 comprises a first sublayer 222 comprising a blend of LDPE and HDPE, a second sublayer 224 comprising LDPE, and a third sublayer 226 comprising LDPE. One or more sublayers (e.g., the first sublayer 222) can also optionally comprise calcium carbonate ($CaCO_3$), which can impart stiffness to the second layer 220 and/or the multi-layer film 200. In certain embodiments, the first sublayer 222 comprises a blend of HDPE, LDPE, and calcium carbonate ($CaCO_3$). For example, the blend can include between about 30% and about 40% by weight of HDPE. The blend can also include between about 10% and about 50% by weight of calcium carbonate ($CaCO_3$), between about 20% and about 50% by weight of calcium carbonate ($CaCO_3$), between about 30% and about 50% by weight of calcium carbonate ($CaCO_3$), or between about 40% and about 50% by weight of calcium carbonate ($CaCO_3$). The blend can also include between about 15% and about 40% by weight of LDPE, between about 15% and about 30% by weight of LDPE, or between about 15% and about 25% by weight of LDPE. In certain of such embodiments, the second and/or third sublayers 224, 226 each comprise polyethylene (e.g., LDPE) or blends thereof.

In the illustrated embodiment, the second layer 220 further comprises a fourth sublayer 228 comprising an adhesive tie material. In other embodiments, the fourth sublayer 228 can comprise LDPE or blends thereof. Other sealant materials can also be included in the fourth sublayer 228.

A fifth sublayer 230 comprises a sealant material or blend of sealant materials, such as one or more ionomers and polybutylene. An additive, such as a cheese release additive, can also optionally be included in the fifth sublayer 230. Various amounts of ionomers, polybutylene, and cheese release additives can also be used. For example, in a particular embodiment the fifth sublayer 230 comprises between about 30% and about 80% by weight, between about 30% and about 75% by weight, between about 40% and about 80% by weight, or between about 50% and about 65% by weight of an ionomer. In certain of such embodiments, the fifth sublayer 230 comprises between about 3% and about 30% by weight, between about 5% and about 25% by weight, between about 10% and about 30% by weight, or between about 10% and about 20% by weight of polybutylene. In still further embodiments, the fifth sublayer 230 comprises between about 10% and about 50% by weight, between about 10% and about 40% by weight, between about 10% and about 30% by weight, between about 14% and about 40% by weight, or between about 14% and about 25% by weight of a cheese release agent. In yet another embodiment, the fifth sublayer 230 comprises between about 5% and about 20% by weight, or between about 10% and about 15% by weight of polyethylene (e.g., LDPE).

The thickness or amount of each sublayer in the second layer 220 can also vary as desired. For example, in some embodiments, the first sublayer 222 comprises between about 45% and about 60%, or between about 50% and about 55% of the thickness of the second layer 220, the second sublayer 224 comprises between about 1% and about 5%, or between about 2% and about 4% of the thickness of the second layer 220, the third sublayer 226 comprises between about 1% and about 5%, or between about 2% and about 4% of the thickness of the second layer 220, the fourth sublayer 228 comprises between about 1% and about 5%, or between about 2% and about 4% of the thickness of the second layer 220, and the fifth sublayer 230 (e.g., which can be a sealing layer) comprises between about 30% and about 50%, or between about 35% and about 40% of the thickness of the second layer 220. Other amounts can also be used.

As further shown in FIG. 2, one or more sealant layers (e.g., the fifth sublayer 230) can be disposed at a position that is furthest away from the first layer 210. In such embodiments, the one or more sealant layers 230 can be described as the innermost layers of the second layer 220, or the innermost layers of the multi-layer film 200. If desired, one or more portions of the sealant layers 230 can be configured to be sealed to itself, or to another layer or sublayer of the multi-layer film 200. For example, the multi-layer film 200 can be wrapped or folded and formed into a packaging structure with the sealant layer 230 being disposed closest or proximal to the cavity or the contents thereof. The sealant layer 230 can then be aligned with itself, or with another layer or sublayer, and sealed by the application of increased pressure and/or temperature (e.g., to form a fin or crimp seal).

In certain embodiments, the multi-layer film 200 exhibits a relatively broad sealing window. For example, in some embodiments, the multi-layer film 200 exhibits a seal strength of between about 350 grams and about 1000 grams, between about 350 grams and about 850 grams, between about 500 grams and about 1000 grams, or between about 500 grams and about 700 grams at seal temperatures of between about 225° F. and about 500° F., or between about 250° F. and about 400° F. (seal strengths can be measured at 40 PSI, 0.5 sec dwell, pulled at 5"/min, 90° angle). Such seal strengths can be advantageous when packaging various types of products, including but not limited to processed cheese and cream cheese. Further, such seal strengths are comparable to those obtained using wax-based films, even though the films disclosed herein can be devoid of wax.

The second layer 220, including each of the sublayers 222, 224, 226, 228, 230 thereof, can be formed in various ways. For example, each of the sublayers 222, 224, 226, 228, 230 can be simultaneously coextruded and blown using coextruded blown film forming techniques to fabricate a multi-layer coextruded blown film. Multi-layer rapid quench blown film techniques, multi-layer cast film techniques, and other known techniques can also be used.

FIG. 3 depicts a multi-layer film 300 according to another embodiment of the present disclosure. As shown in FIG. 3, in some embodiments, the multi-layer film 300 comprises a first layer 310 and a second layer 320, which are joined using an intermediate layer 312, such as a tie layer or an adhesive layer. The multi-layer film 300 further comprises a foil layer 340 (e.g., metal foil layer) joined to the first layer 310 by another intermediate layer 342, such as a tie layer or an adhesive layer (it will be appreciated that any of the above-mentioned tie and/or adhesive materials identified above with respect to FIG. 1 can be used). In some of such embodiments, the foil layer 340 can be described as the outermost layer of the multi-layer film 300, while the second layer 320 is the innermost layer. Further, the second layer 320 can comprise various sublayers (e.g., sealant layer), as described above with respect to FIG. 2. In still other embodiments, the foil layer 340 can be adhered to the second layer 320 (e.g., with a tie or adhesive layer) in place of the first layer 310, or the first layer 310 can comprise a foil material.

Methods of manufacturing multi-layer films are also disclosed herein. In particular, it is contemplated that any of the components, principles, and/or embodiments discussed above may be utilized in either a multi-layer film construction or a method of manufacturing and using the same. For example, in an embodiment, a method of manufacturing a multi-layer film construction can comprise a step of coextruding a plurality of polymeric materials and blowing the coextruded polymeric materials to form a multi-layer coextruded blown film layer. As disclosed above, the resulting multi-layer coextruded blown film layer can comprise one or more sealant layers. The method can further comprise a step of laminating the multi-layer coextruded blown film layer to a heat resistant layer. In some embodiments, laminating the multi-layer coextruded blown film layer to the heat resistant layer comprises extrusion lamination with an intermediate layer, such as a tie layer. In other embodiments, the multi-layer coextruded blown film layer is laminated to the heat resistant layer with an intermediate layer, such as an adhesive layer. A foil layer can also be added. Additional processing steps, and/or methods, can also be employed.

EXAMPLES

The following examples are illustrative of embodiments of the present disclosure, as described above, and are not meant to be limiting in any way.

Example 1

A first multi-layer film sample (Sample 1) was prepared by laminating a first layer to a second layer using an adhesive layer (other techniques (e.g., extrusion lamination) could also be used). The first layer comprised polyethylene terephthalate (PET) (48 gauge), and the second layer comprised the five-layer coextruded blown film (2 mil total) described in the table below, with the first sublayer being disposed closest to the PET layer and the fifth sublayer being disposed furthest away from the PET layer. The first layer was also printed upon, with the printed surface adhered to the second layer. The arrangement of the multi-layer film can be illustrated as follows: first layer/ink/adhesive/second layer.

| Structure Sublayer | Percent of Total Structure (Thickness %) | Materials and Percent by Weight of Structure Layer |
|---|---|---|
| 1 | 52 | 35% HDPE<br>45% CaCO₃<br>20% LDPE |
| 2 | 2.67 | LDPE |
| 3 | 2.67 | LDPE |
| 4 | 2.67 | Adhesive Tie |
| 5 | 40 | 71% Ionomer<br>5% Polybutylene<br>14% Cheese Release Additive<br>10% Slip and Anti-Block Additives |

Example 2

A second multi-layer film sample (Sample 2) was prepared by laminating a first layer to a second layer using an adhesive layer (extrusion lamination could also be used). The first layer comprised polyethylene terephthalate (PET) (48 gauge), and the second layer comprised the five-layer coextruded blown film (2 mil total) described in the table below, with the first sublayer being disposed closest to the PET layer and the fifth sublayer being disposed furthest away from the PET layer. The first layer was also printed upon, with the printed surface adhered to the second layer. The arrangement of the multi-layer film can be illustrated as follows: first layer/ink/adhesive/second layer.

| Structure Sublayer | Percent of Total Structure (Thickness %) | Materials and Percent by Weight of Structure Layer |
|---|---|---|
| 1 | 52 | 35% HDPE<br>45% CaCO₃<br>20% LDPE |
| 2 | 2.67 | LDPE |
| 3 | 2.67 | LDPE |
| 4 | 2.67 | Adhesive Tie |
| 5 | 40 | 62% Ionomer<br>13% Polybutylene<br>14% Cheese Release Additive<br>11% Slip and Anti-Block Additives |

Example 3

A third multi-layer film sample (Sample 3) was prepared by laminating a first layer to a second layer using an adhesive layer (other techniques (e.g., extrusion lamination) could also be used). The first layer comprised metalized polyethylene terephthalate (MET PET) (48 gauge), and the second layer comprised the five-layer coextruded blown film (2 mil total) described in the table below, with the first sublayer being disposed closest to the MET PET layer and the fifth sublayer being disposed furthest away from the MET PET layer. The first layer was also printed upon, with the printed surface adhered to the second layer. The arrangement of the multi-layer film can be illustrated as follows: first layer/ink/adhesive/second layer.

| Structure Sublayer | Percent of Total Structure (Thickness %) | Materials and Percent by Weight of Structure Layer |
|---|---|---|
| 1 | 52 | 35% HDPE<br>45% CaCO₃<br>20% LDPE |
| 2 | 2.67 | LDPE |
| 3 | 2.67 | LDPE |
| 4 | 2.67 | Adhesive Tie |
| 5 | 40 | 62% Ionomer<br>13% Polybutylene<br>14% Cheese Release Additive<br>11% Slip and Anti-Block Additives |

Example 4

A fourth multi-layer film sample (Sample 4) was prepared by laminating a first layer to a second layer using an adhesive layer (other techniques (e.g., extrusion lamination) could also be used). The first layer comprised oriented polypropylene (OPP) (75 gauge), and the second layer comprised the five-layer coextruded blown film (2 mil total) described in the table below, with the first sublayer being disposed closest to the OPP layer and the fifth sublayer being disposed furthest away from the OPP layer. The first layer was also printed upon, with the printed surface adhered to the second layer. The arrangement of the multi-layer film can be illustrated as follows: first layer/ink/adhesive/second layer.

| Structure Sublayer | Percent of Total Structure (Thickness %) | Materials and Percent by Weight of Structure Layer |
|---|---|---|
| 1 | 52 | 35% HDPE<br>45% CaCO₃<br>20% LDPE |
| 2 | 2.67 | LDPE |
| 3 | 2.67 | LDPE |
| 4 | 2.67 | Adhesive Tie |
| 5 | 40 | 62% Ionomer<br>13% Polybutylene<br>14% Cheese Release Additive<br>11% Slip and Anti-Block Additives |

Example 5

A fifth multi-layer film sample (Sample 5) was prepared by laminating a first layer to a second layer using an adhesive layer (other techniques (e.g., extrusion lamination) could also be used). The first layer comprised oriented polypropylene (OPP) (55 gauge), and the second layer comprised the five-layer coextruded blown film (2 mil total) described in the table below, with the first sublayer being disposed closest to the OPP layer and the fifth sublayer being disposed furthest away from the OPP layer. The first layer was also printed upon, with the printed surface adhered to the second layer. The arrangement of the multi-layer film can be illustrated as follows: first layer/ink/adhesive/second layer.

| Structure Sublayer | Percent of Total Structure (Thickness %) | Materials and Percent by Weight of Structure Layer |
|---|---|---|
| 1 | 52 | 35% HDPE |
|   |   | 45% CaCO$_3$ |
|   |   | 20% LDPE |
| 2 | 2.67 | LDPE |
| 3 | 2.67 | LDPE |
| 4 | 2.67 | Adhesive Tie |
| 5 | 40 | 62% Ionomer |
|   |   | 13% Polybutylene |
|   |   | 14% Cheese Release Additive |
|   |   | 11% Slip and Anti-Block Additives |

Example 6

A sixth multi-layer film sample (Sample 6) was prepared by laminating a first layer to a second layer using an adhesive layer (other techniques (e.g., extrusion lamination) could also be used). The first layer comprised metalized polyethylene terephthalate (MET PET) (48 gauge), and the second layer comprised the five-layer coextruded blown film (2 mil total) described in the table below, with the first sublayer being disposed closest to the MET PET layer and the fifth sublayer being disposed furthest away from the MET PET layer. The first layer was also printed upon, with the printed surface directed away from the second layer and covered with an overprint varnish. The arrangement of the multi-layer film can be illustrated as follows: overprint varnish/ink/first layer/adhesive/second layer.

| Structure Sublayer | Percent of Total Structure (Thickness %) | Materials and Percent by Weight of Structure Layer |
|---|---|---|
| 1 | 52 | 35% HDPE |
|   |   | 45% CaCO$_3$ |
|   |   | 20% LDPE |
| 2 | 2.67 | LDPE |
| 3 | 2.67 | LDPE |
| 4 | 2.67 | Adhesive Tie |
| 5 | 40 | 62% Ionomer |
|   |   | 13% Polybutylene |
|   |   | 14% Cheese Release Additive |
|   |   | 11% Slip and Anti-Block Additives |

Example 7

A seventh multi-layer film sample (Sample 7) was prepared by laminating a first layer to a second layer using an adhesive layer (other techniques (e.g., extrusion lamination) could also be used). The first layer comprised metalized polyethylene terephthalate (MET PET) (48 gauge), and the second layer comprised the five-layer coextruded blown film (2 mil total) described in the table below, with the first sublayer being disposed closest to the MET PET layer and the fifth sublayer being disposed furthest away from the MET PET layer. The first layer was also printed upon, with the printed surface directed away from the second layer and covered with an overprint varnish. The arrangement of the multi-layer film can be illustrated as follows: overprint varnish/ink/first layer/adhesive/second layer.

| Structure Sublayer | Percent of Total Structure (Thickness %) | Materials and Percent by Weight of Structure Layer |
|---|---|---|
| 1 | 52 | 35% HDPE |
|   |   | 45% CaCO$_3$ |
|   |   | 20% LDPE |
| 2 | 2.67 | LDPE |
| 3 | 2.67 | LDPE |
| 4 | 2.67 | Adhesive Tie |
| 5 | 40 | 51% Ionomer |
|   |   | 13% Polybutylene |
|   |   | 25% Cheese Release Additive |
|   |   | 11% Slip and Anti-Block Additives |

Example 8

An eighth multi-layer film sample (Sample 8) was prepared by laminating a first layer to a second layer using an adhesive layer (other techniques (e.g., extrusion lamination) could also be used). The first layer comprised polyethylene terephthalate (PET) (48 gauge), and the second layer comprised the five-layer coextruded blown film (1.5 mil total) described in the table below, with the first sublayer being disposed closest to the PET layer and the fifth sublayer being disposed furthest away from the PET layer. An aluminum foil layer (30 gauge) was also adhered to the first layer on a side opposite the second layer. The foil layer was also printed upon, with the printed surface directed away from the first layer and covered with an overprint varnish. The arrangement of the multi-layer film can be illustrated as follows: overprint varnish/ink/foil layer/adhesive/first layer/adhesive/second layer.

| Structure Sublayer | Percent of Total Structure (Thickness %) | Materials and Percent by Weight of Structure Layer |
|---|---|---|
| 1 | 52 | 35% HDPE |
|   |   | 45% CaCO$_3$ |
|   |   | 20% LDPE |
| 2 | 2.67 | LDPE |
| 3 | 2.67 | LDPE |
| 4 | 2.67 | Adhesive Tie |
| 5 | 40 | 62% Ionomer |
|   |   | 13% Polybutylene |
|   |   | 14% Cheese Release Additive |
|   |   | 11% Slip and Anti-Block Additives |

Example 9

Additional five-layer coextruded blown film sealant layers were prepared as follows, each of which is representative of another type of second layer or sealing layer that can be used in accordance with the principles disclosed herein.

Sample A

| Structure Sublayer | Percent of Total Structure (Thickness %) | Materials and Percent by Weight of Structure Layer |
|---|---|---|
| 1 | 52 | 35% HDPE |
| | | 45% CaCO$_3$ |
| | | 20% LDPE |
| 2 | 2.67 | LDPE |
| 3 | 2.67 | LDPE |
| 4 | 2.67 | LDPE |
| 5 | 40 | 50% Ionomer |
| | | 13% Polybutylene |
| | | 14% Cheese Release Additive |
| | | 12% LDPE |
| | | 11% Slip and Anti-Block Additives |

Sample B

| Structure Sublayer | Percent of Total Structure (Thickness %) | Materials and Percent by Weight of Structure Layer |
|---|---|---|
| 1 | 52 | 35% HDPE |
| | | 45% CaCO$_3$ |
| | | 20% LDPE |
| 2 | 2.67 | LDPE |
| 3 | 2.67 | LDPE |
| 4 | 2.67 | Adhesive Tie |
| 5 | 40 | 54% Ionomer |
| | | 13% Polybutylene |
| | | 22% Cheese Release Additive |
| | | 11% Slip and Anti-Block Additives |

Sample C

| Structure Sublayer | Percent of Total Structure (Thickness %) | Materials and Percent by Weight of Structure Layer |
|---|---|---|
| 1 | 52 | 35% HDPE |
| | | 45% CaCO$_3$ |
| | | 20% LDPE |
| 2 | 2.67 | LDPE |
| 3 | 2.67 | LDPE |
| 4 | 2.67 | Adhesive Tie |
| 5 | 40 | 58% Ionomer |
| | | 13% Polybutylene |
| | | 18% Cheese Release Additive |
| | | 11% Slip and Anti-Block Additives |

Example 10

Figure 4:
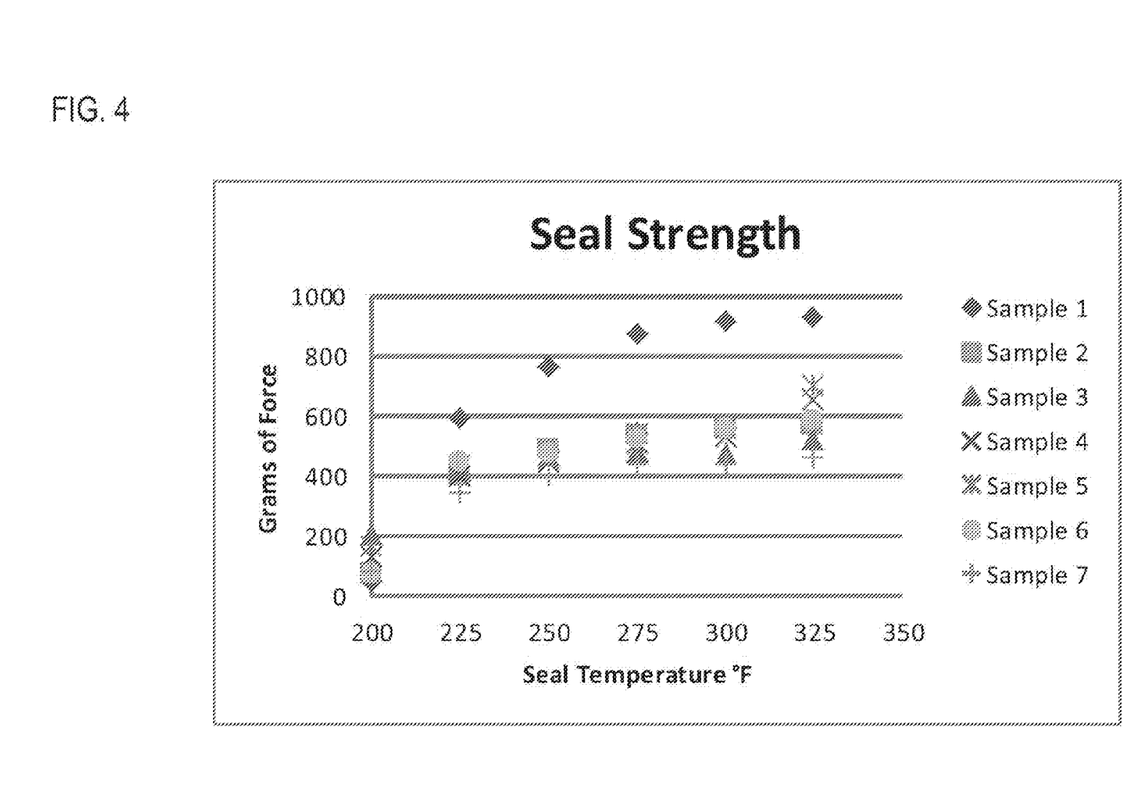
FIG. 4 is a graph of the seal strength of various film samples, according to an embodiment of the present disclosure.

The seal strengths of the multi-layer film samples of Examples 1-7 were measured at 40 PSI, 0.5 sec dwell, pulled at 5"/min, 90° angle, the results of which are depicted in FIG. 4 and shown in the table below:

| Seal Temp. (° F.) | Seal Strength by Sample (grams) | | | | | | |
|---|---|---|---|---|---|---|---|
| | Sample 1 | Sample 2 | Sample 3 | Sample 4 | Sample 5 | Sample 6 | Sample 7 |
| 200 | 45 | 75 | 202 | 132 | 161 | 74 | 81 |
| 225 | 592 | 396 | 420 | 397 | 435 | 445 | 343 |
| 250 | 766 | 488 | 464 | 449 | 453 | 475 | 399 |
| 275 | 876 | 538 | 484 | 510 | 542 | 523 | 439 |
| 300 | 916 | 560 | 477 | 529 | 555 | 559 | 440 |
| 325 | 929 | 570 | 523 | 651 | 703 | 587 | 458 |

As shown in FIG. 4 and the table above, each of the films exhibited seal strengths of between about 350 grams and about 1000 grams at seal temperatures of between about 225° F. and about 400° F.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

References to approximations are made throughout this disclosure, such as by use of the term "about." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. Further, all ranges include both endpoints.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims and their equivalents.

The invention claimed is:

1. A multi-layer film construction, comprising:
a first layer comprising at least one of a polyamide, polyester, polypropylene, metal foil, cellulose, or paper; and
a second layer comprising an ionomer, polybutylene, and a cheese release additive, wherein the second layer comprises a first sublayer and a second sublayer, wherein the first sublayer comprises the ionomer and the polybutylene, and wherein the second sublayer comprises calcium carbonate.

2. The multi-layer film construction of claim 1, wherein the ionomer comprises an ethylene methacrylic acid copolymer or a salt thereof.

3. The multi-layer film construction of claim 1, wherein the ionomer comprises a melt flow rate of between about 0.5 g/10 min and about 15 g/10 min, between about 0.6 g/10 min and about 0.9 g/10 min, between about 1.0 g/10 min and about 1.6 g/10 min, between about 1.7 g/10 min and about 2.5 g/10 min, between about 2.6 g/10 min and about 6.0 g/10 min, or between about 6.1 g/10 min and about 15 g/10 min.

4. The multi-layer film construction of claim 1, wherein the ionomer comprises a melting point of between about 190° F. and about 230° F.

5. The multi-layer film construction of claim 1, wherein the ionomer comprises a vicat softening point of between about 125° F. and about 180° F.

6. The multi-layer film construction of claim 1, wherein the second layer comprises between about 30% and about 80% by weight of the ionomer.

7. The multi-layer film construction of claim 6, wherein the second layer comprises between about 3% and about 30% by weight of polybutylene.

8. The multi-layer film construction of claim 1, further comprising a foil layer.

9. The multi-layer film construction of claim 1, wherein the multi-layer film construction is devoid of wax.

10. The multi-layer film construction of claim 1, wherein the film comprises a seal strength of between about 250 grams and about 1000 grams at seal temperatures between about 225° F. and about 500° F.

11. A package comprising the multi-layer film construction of claim 1, wherein the second layer is disposed on the interior of the package.

12. The package of claim 11, further comprising a cheese product within the package that is in contact with the second layer.

13. A multi-layer film construction, comprising:
first layer comprising at least one of a polyamide, polyester, polypropylene, metal foil, cellulose, or paper; and
a second layer comprising:
a first sublayer comprising polyethylene and calcium carbonate; and
a second sublayer comprising an ionomer, polybutylene, and a cheese release additive.

14. The multi-layer film construction of claim 13, wherein the second layer further comprises a third sublayer comprising polyethylene, a fourth sublayer comprising polyethylene, and a fifth sublayer comprising an adhesive material.

15. The multi-layer film construction of claim 13, further comprising a foil layer.

16. The multi-layer film construction of claim 13, wherein the multi-layer film construction is devoid of wax.

17. A multi-layer film construction, comprising:
a first layer comprising at least one of a polyamide, polyester, polypropylene, metal foil, cellulose, or paper; and
a second layer comprising a multi-layer film comprising:
a first sublayer comprising polyethylene and calcium carbonate;
a second sublayer comprising polyethylene;
a third sublayer comprising polyethylene;
a fourth sublayer comprising at least one of polyethylene or an adhesive tie material; and
a fifth sublayer comprising an ionomer, polybutylene, and a cheese release additive, wherein the first sublayer is disposed adjacent to the first layer.

* * * * *